Feb. 6, 1934.  O. U. ZERK  1,945,845
LUBRICATING MEANS
Filed Nov. 21, 1929  3 Sheets-Sheet 1

Inventor:
Oscar U. Zerk

Feb. 6, 1934.   O. U. ZERK   1,945,845
LUBRICATING MEANS
Filed Nov. 21, 1929   3 Sheets-Sheet 3

Inventor:
Oscar U. Zerk

Patented Feb. 6, 1934

1,945,845

UNITED STATES PATENT OFFICE 1,945,845

LUBRICATING MEANS

Oscar U. Zerk, Chicago, Ill., assignor to Alemite Corporation, Chicago, Ill., a corporation of Delaware Application November 21, 1929
Serial No. 408,715

5 Claims. (Cl. 184—26)

My invention relates to lubricating means and relates more particularly to improvements in that type of lubricating means adapted to be permanently mounted on elements of machine bearings.

More specifically, my invention relates to the provision of improved inertia operated lubricant cups, which are adapted to supply lubricant to elements of bearings associated therewith, by virtue of the inertia action of moving parts of the mechanism provided with said bearings.

While my invention is applicable to any kind of vehicle or stationary machine where oscillatory movements occur, it is more particularly applicable to the lubrication of an automotive vehicle chassis wherein the unevenness of the road effecting "road shocks" which are only partly absorbed by the tires of the vehicle and by the springs supporting the frame of the vehicle.

At the present time, two methods are commonly employed to lubricate the chassis bearings of an automotive vehicle, namely, first, lubrication by means of a grease gun applied successively to lubricate receiving elements individual to chassis bearings of the vehicle, and second, the method which involves the supplying of lubricant from a central source of supply to the different bearings of the chassis, to which the lubricant is conducted by lubricant conduits; systems of the first class are commonly known as grease gun systems and systems of the second class as centralized lubricating systems.

In the first system a grease gun must be successively placed in lubricant communicating contact with a large number of nipples, each associated with a different one of the chassis bearings of the automobile which to most persons is a very unhandy, dirty and tedious operation, and due to this fact, owners of automobiles equipped with such a grease gun system generally prefer to have this objectionable operation done for them in especially equipped service stations, where the automobile is run on an incline to be in an elevated position, or where the automobile is bodily lifted high into the air for the purpose of effecting more ready access to every bearing of the automobile by attendants preferably equipped with a power operated lubricating device.

Therefore, the lubrication of the chassis bearings in service stations, which should preferably be done about every 500 miles, or about twenty times a year, results in a very considerable expense to the automobile owner.

In the ordinary use of the centralized lubricating system, the automobile owner requires much less lubricating service, and, therefore, the expense for this service is greatly reduced, which represents a very considerable saving during the life of a car. The principal disadvantage of a centralized lubricating system is, of course, its much higher cost to the manufacturer, and this causes automobile manufacturers to hesitate to equip cars made by them with centralized lubricating systems. When rubber spring shackle mechanisms or ball bearing spring shackle mechanisms are used, relatively few bearings are required to be lubricated by an expensive centralized lubricating system, since rubber spring shackle mechanisms require no lubrication, and when ball bearing shackles are used, which are packed with a large quantity of grease, the cavity surrounding the ball bearing has only to be filled once in 10,000 miles, which on the average, is approximately once a year.

Since rubber shackles and ball bearing shackles are considerably more expensive than plain shackles, the automobile manufacturer of medium priced cars cannot afford to add the additional large expense of adopting a centralized lubricating system as standard equipment, to the very considerable cost of rubber shackles or ball bearing shackles.

The adoption of rubber shackles or ball bearing shackles by the manufacturer, shows a desire on his part to give the automobile user not only a more efficient shackle construction or one which is more efficiently lubricated, but a system which does not require frequent recharging with lubricant, as is the case with grease gun lubrication. However, the desire to adopt a centralized lubricating system for the same reason is defeated.

Therefore, due to the high cost of a centralized lubricating system, a third system of automatic chassis lubrication not having the disadvantages of a grease gun system and not requiring the high initial cost of a centralized lubricating system is very desirable.

Such a third system is provided in my present invention which provides for each bearing, an inertia operated oil cup, preferably filled with high viscosity oil.

Although devices of this kind can be used on all bearings of an automobile chassis, it is preferred not to place them on any outer exposed bearings such as shackle bearings or the like, due to the fact that the relatively large oil reservoir which is required, would be rather ungainly in appearance and due to its exposed position would readily be struck and broken off by extraneous objects encountered by it.

The adoption of automatically operative inertia oil cups has the additional advantage that they can be used as "part" insulation, that is, they may be installed only on those bearings where failure to lubricate frequently would result in freezing of the bearing. Examples of bearings of this type are king bolts of the plain bearing type, commonly installed in connection with the steering wheels of the vehicle.

Although inertia operated oil cups have been known for many years, they have not been extensively used, because the relatively small amount of oil, capable of being stored in such an oil cup was soon exhausted. They also had the disadvantage that when taken apart for refilling, loose parts of the mechanism would drop out and become lost.

Also, such prior devices were objectionable since the lubricant ejecting mechanism thereof was responsive to road shocks of all characters in such a way that more lubricant would be dispensed to the bearings than would reasonably be required for the purpose of lubrication, and therefore, the supply of lubricant would soon become exhausted.

An object, therefore, of my invention is to provide an improved lubricating means adapted to supply lubricant to an associated bearing to which it is individual.

Another object of my invention is to provide an improved lubricating device adapted to hold and dispense lubricant to an associated bearing in a highly efficient economical manner.

Another object of my invention is to provide a relatively inexpensive, efficiently operative lubricating device of the above general character.

Another object of my invention is to provide an improved inertia operated lubricating device adapted to hold and to economically and efficiently dispense a supply of lubricant to a bearing associated therewith in small amounts periodically, whereby the supply held by the device would be sufficient for a long period of use of the bearing.

Another object of my invention is to provide an improved inertia operated lubricating device employing an inertia spring and a weight so proportioned and so related that ejection of lubricant by relative movements of the weight and lubricant containing cases will be had only upon the occurrence of very heavy road shocks effected upon the vehicle.

Another object of my invention is to provide, in an inertia operable lubricating mechanism, an oscillatable inertia element for operating the same, adapted to oscillate in air, so that its movements will not be dampened by contact with the lubricant.

Another object of my invention is to provide an automatically operable lubricant dispensing mechanism containing a lubricant reservoir, wherein a reciprocating piston is employed to dispense the lubricant, operable by inertia weight, and wherein movements of the piston induced by the weight, are accomplished in such a manner that the piston is guided solely by its own outer surface and the engaged surface of a longitudinal bore in which it is reciprocated.

Another object of my invention is to provide a lubricating cup having a stem and a tubular projection of the stem within the cup, wherein the cup and stem are secured together in an improved manner.

Another object of my invention is to provide an improved manner of supporting a weight inertia element for a lubricant of the automatically operable inertia type, whereby said weight may be efficiently reciprocated with little friction, by the effect of movements of the mechanism on which the lubricator is mounted.

Another object of my invention is to provide an inertia weight operated lubricator employing a piston for dispensing lubricant operable by relative movements of the weight and the lubricator casing, and wherein the weight element will be guided for efficient engagement with an element of the piston to operate the same.

Another object of my invention is to provide a quietly operating inertia operated lubricator.

Another object of my invention is, as disclosed in an alternative embodiment, to tightly close and, therefore, to separate the oil chamber from the inertia chamber.

Another object of my invention is, as disclosed in said alternative embodiment, to employ in combination with a tightly closed oil reservoir, an air vent valve adapted to permit air at atmospheric pressure to enter said chamber as the oil is dispensed therefrom, and to permit air to leave the chamber when a new supply of oil is supplied to the chamber, and which will be closed when a predetermined amount of oil is received within the chamber.

Another object of my invention is to provide for recharging a lubricator having an oil reservoir, and which is individual to an element of bearing to be lubricated, whereby the recharging may be accomplished from a desired radial direction.

Another object of my invention is to provide an improved inertia operating lubricator for an element of bearing wherein lubricant may be dispensed below the level of the lubricant inlet to the bearing, and to efficiently and automatically dispense lubricant thereto during operation of the mechanism having the bearing.

Another object of my invention is to provide an improved lubricating means adapted to be secured to an element of bearing to be individually lubricated thereby and which will be operative to store a considerable supply of lubricant and to dispense the same in small increments to the bearing only upon the occurrence of road shocks of a character to which the vehicle is not frequently exposed.

Another object of my invention is to provide an improved lubricating means adapted to be secured to an element of bearing to be individually lubricated thereby and which will be operative to store a considerable supply of lubricant and to dispense the same in small increments to the bearing only upon the occurrence of severe road shocks.

Another object of my invention, is to provide an inertia operated oil cup, preferably filled with high viscosity oil having an enclosing cup and cap and operative elements therein, secured in such a way that when the cap is removed from the cup that none of these parts may drop out and get lost.

Other objects of my invention and the invention itself will become apparent from the following description of certain embodiments of my invention, and in which description reference will be had to the accompanying drawings illustrating the said embodiment.

Referring to the drawings.

Figure 1:
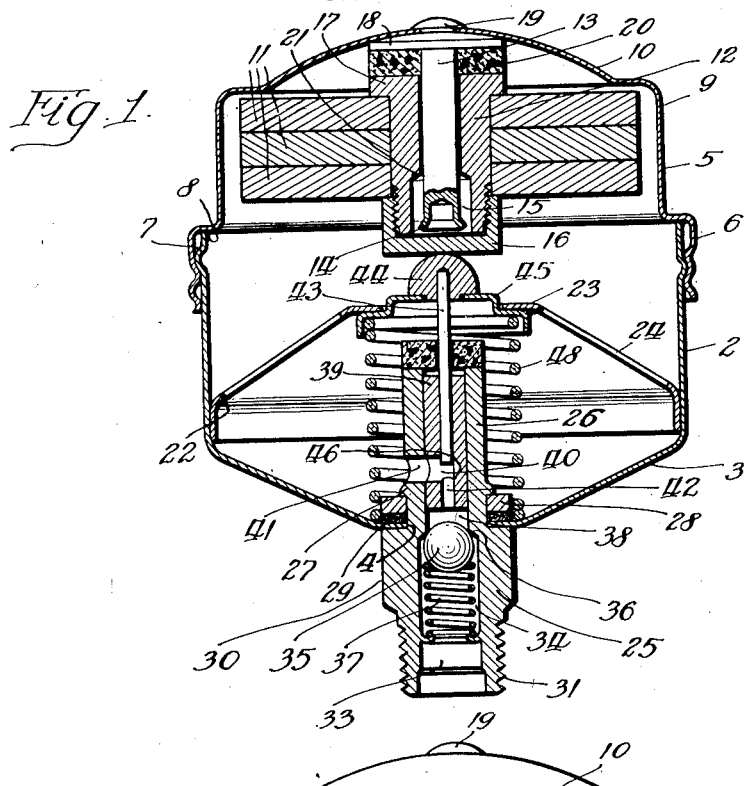
Fig. 1 shows a longitudinal medial sectional view of an embodiment of my invention.

Referring now first to the embodiment of my invention illustrated in Fig. 1, the oil cap of the said embodiment comprises a substantially cup-shaped casing 2 having a longitudinally tapered end wall centrally perforated at 4 over the mouth of which a cap 5 is applied by screw threading the threaded flange 6 of the cap on to the threads 7 of the lateral walls of the casing 2, which are disposed adjacent its rim 8.

The cap is provided with intermediate preferably cylindrical walls 9 and a concavo-convex end wall, the enlarged securing flange 6 having screw threads formed therein.

The end wall 10 of the cap is centrally perforated and a rod 13, disposed within the cap, is rigidly secured by a projection of the rod extending through the central perforation of the cap wall, being headed over as shown at 19.

A radial flange 18 of the rod 13, having a convex outer surface, engages the concave inner surface of the cap end wall 10, and ensures that the rod 13 is properly aligned axially of the cap wall 5.

An inertia element comprising centrally perforated disks 11 and a hub 12, is journaled for longitudinal reciprocation on the rod 13, extending through the longitudinal bore of the head. A cap 16, screw threaded on the end of the hub, securely clamps the discs between an enlarged head 17 of the hub and said cap.

The free end of the rod 13 is provided with an end recess and the end walls thereof are flared outwardly to engage the end of the rod to prevent the inertia element from being lost off the rod 13 when the cap 5 is removed from the casing 2. A washer 20 of rubber or like material is interposed between the radial flange 18 of the rod 13 and the adjacent end surface of the hub head 17.

The recess 15 is of such depth relative to the portion of the rod 13 disposed therein, and the position of the flange 14 thereof, that the inertia element may reciprocate for the distance shown as provided between said flange 14 and the tapered end wall 21 of the recess when the parts are in their relative positions as illustrated in Fig. 1.

A sheet metal bridge is secured within the casing 2 having a peripherally disposed supporting tube 22, a centrally disposed annulus 23, and interconnecting arms 24. The supporting tube 22 is tightly fitted within the tubular lateral walls of the casing and positioned contiguously to the junction between said casing lateral walls and the tapered casing end walls 3.

The arms 24 are disposed in spaced relation whereby free lubricant communication is established between the portions of the casing disposed at either side of the bridge.

The lubricator per se comprises a tubular body 25 projecting by a reduced end 26 within the casing through the central aperture 4 of the casing end wall 3, and is secured to said end wall by broached projections 27 of the portion 26 engaging a washer 28 surrounding it, to clamp the portions of said end wall 3 bordering its central aperture 4 securely between the shoulder formed by the junction of the enlarged intermediate portion of the body 25 and an annular gasket 29 interposed between the inner surface of said end wall border and said washer 27.

The gasket is provided to prevent leakage of lubricant past the joint through said end wall aperture. The intermediate enlarged portion 30 of the lubricator body 25 is preferably made of hexagonal or other polygonal form, whereby the reduced externally threaded stem 31 at the outer end of the body may be screw threaded by engagement of a suitable tool with said portion 30 into a threaded recess such as that indicated at 31 for the coupling element 32, Fig. 2.

The bore of the lubricator body comprises longitudinally disposed stepped portions including a discharge portion 33 of largest diameter, a reduced valve chamber portion 34 containing a valve ball 35 spring pressed to seat at 36 by a valve spring 37 contained in said chamber, and a relatively reduced bore portion 38, into which a longitudinally bored cylindrical plug 39 is tightly pressed.

The valve seat 36 is provided by the junction of the relatively reduced bore portion 38 with the relatively enlarged bore portion 34.

The cylindrical element 39 is provided with a longitudinal bore of relatively small diameter extending therethrough and its lateral wall is perforated at 40 in alignment with a like perforation 41 through a lateral wall of the portion 26 of the lubricator body, whereby lubricant in the casing 2 is adapted to be communicated through both said perforations, to the longitudinal bore of the cylinder 39 and particularly to that portion thereof indicated at 42 disposed between said perforation and the valve 35.

A slender rod 43 operating both as a piston and a piston rod, having a head 44 rigidly affixed thereto and which carries a sheet metal element 45 is projected into the longitudinal bore of the cylinder 39 and is reciprocatable therein from its position as shown in Fig. 1 to a relatively advanced position wherein its end 46 is advanced past the perforation 40 of the cylinder wall and into the compression chamber 42 of the cylinder.

Such an advance movement of the piston 43 will shut off communication between the compression chamber 42 of the longitudinally extending bore of the cylinder and the aligned lubricant inlet perforations 40 and 41 and will displace lubricant contained within the compression chamber 42, therefrom to effect passage of lubricant under resulting pressure from the interposed bore portion 38 and the valve 35 past said valve which is momentarily unseated to effect a movement of lubricant past the valve spring 37 and from the exhaust passage 33 to the bearing in communication therewith to be lubricated.

Figure 2:
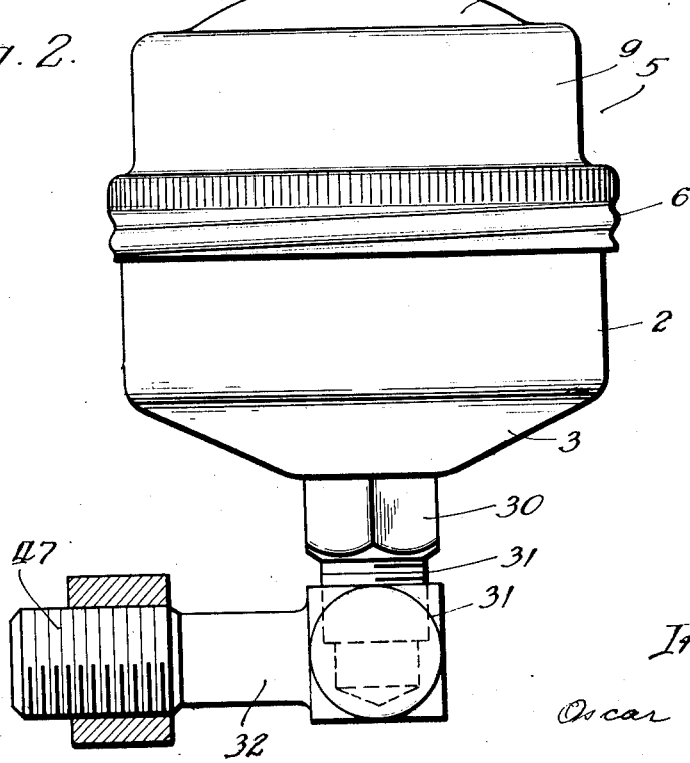
Fig. 2 is a side elevational view of the device of Fig. 1, and also of a special coupling element adapted to support it.

This may, as shown in Fig. 2, involve passage of lubricant through the coupling 32 and threaded stem 47 thereof to the surfaces of said bearing adjacent said stem, or the stem 31 of the lubricator body may be directly screw-threaded contiguous to said bearing surfaces which are then supplied with lubricant directly from the exhaust passage 33. The element 45 supported by the knob shaped head 44 of the piston rod 43 is substantially in the form of a cup having stepped lateral walls to form annular shoulders of successively reduced diameters, and is centrally perforated to permit a neck of the knob 44 by which the knob is rigidly secured centrally of said element 45. A helical spring 48 surrounding the portion of the lubricator disposed within the casing is compressed between the end wall 3 of the casing and a shoulder of the element 45 being received within the peripheral flange of said element and resiliently presses the element 45 against the annular portion 23 of the bridge 24 which surrounds a relatively reduced inwardly disposed portion of the lateral walls of said element. Said element 45 is thereby positioned centrally of the casing and restrained from undue outward movement due to pressure of the spring 48 by virtue of the annulus 23 making engagement with it.

As shown in Fig. 1 the end of the knob 44 is normally in engagement with the lower end of the cap 16 of the inertia element, said cap forming a contact element therefor engageable with the knob 44 forming the other contact element of a pair of said elements.

The operation of the lubricating means whose parts have been above, specifically described, will now be had under the assumption that first, the casing 2 is filled with lubricant and the cap 5 placed thereon, shown, and the passages provided by the perforations 40, 41, the bore portions 42, 38, the valve chamber 34 and the passages 33, etc. leading to the bearing surfaces are entirely supplied with lubricant, or at least such of those as are on the approach side of the valve 35 are so filled with lubricant.

The latter would occur in any event, by action of gravity lubricant flowing through the perforations 40 and 41 into the compression chamber 42 and therefrom into the space 38 between said chamber and the valve bore 35.

Assuming that the lubricator is now supported upright, as illustrated, on a chassis bearing of an automobile, such as a spring shackle bearing, the parts will remain inoperative until, due to a sufficiently abrupt and sufficient violent upward movement of the chassis part supporting said lubricator and comprising, it will be assumed, an element of bearing, the casing is suddenly thrust upwardly.

Upon such an occurrence, the inertia element including the weights 11 in the form of centrally bored disks will, because of the property of inertia, tend to remain stationary, and therefore acting through the hub 12 and cap 16 will resist the upward movement of the piston rod 43 because of engagement of its terminal knob 44 with said cap, and therefore the casing 2 supporting the lubricator per se 25 will effect an upward movement of the cylinder 39 over the piston 43, which is temporarily restrained by the inertia element from upward movement and the piston 43 and cylinder 39 will be thereupon suddenly relatively telescoped with the end portion 46 of the piston extending within the compression chamber 42 forming a terminal portion of the cylinder bore, to displace lubricant contained in said chamber and thereby effecting unseating of the valve 35 and the movement of lubricant from the space 38 past said valve to the parts to be lubricated, as before described.

Of course, the shock occasioned being of but short duration, the parts will soon be restored to their normal position, shown in Fig. 1, where they will remain until the occurrence of another sufficiently severe and abrupt shock occasioning the same operation as previously described. The retraction of the parts will be had under the motivating influence of the spring 48 which pressing upwardly on the element 45 will retract the piston rod 43 effecting recommunication between the lubricant in the casing and the compression chamber 42 to recharge said compression chamber with lubricant, and will moreover acting through the knob 44 in engagement with the cap 16 restore the inertia element to its relatively elevated position within the cap.

Figure 3:
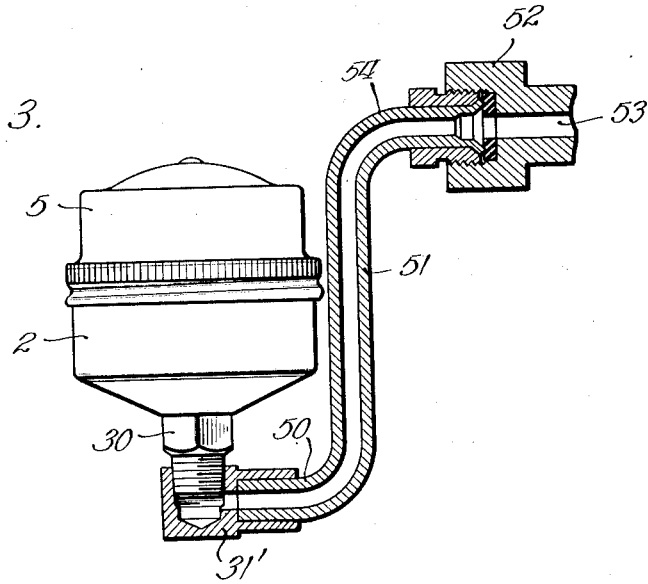
Fig. 3 is a side elevational view of the embodiment of the foregoing figures but employing a modified form of support coupling.
Figure 4:
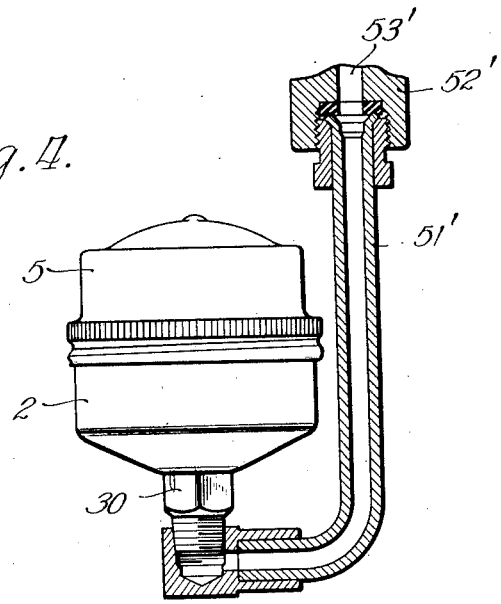
Fig. 4 is a view like that of Fig. 3 but showing a still different form of supporting coupling.

In Figs. 3 and 4 lubricating means as illustrated in Fig. 1 is shown mounted onto a modified form of lubricant communicating coupling, that in Fig. 3 comprising a lubricator holder 31' having a vertical and horizontal bore into the latter of which a laterally extending arm 50 of an approximately S-shaped supporting tube 51 is pressed, said supporting tube being rigidly secured above the level of the lubricating casing 2, and even as shown in the embodiment illustrated, above the level of the cap 5 to an element of bearing 52 required to be supplied with lubricant.

In such a case lubricant supplied in increments by virtue of successive relative reciprocatory movements of the piston and cylinder 43 and 39, respectively, until the lubricant passage provided by the supporting tube 51 and successive operations of the piston will, at each operation, communicate such an amount of lubricant to the bearing passage 53 as is displaced from the compression chamber 42 by the piston 43 projected therein. The tube 51' of Fig. 4 does not have the laterally extending end, as shown at 54, for the tube of Fig. 3, but is substantially L-shaped and is secured to an element of bearing 52' which has a vertical passage 53'. This passage will be progressively supplied with lubricant under pressure resulting from the successive relative movements of the piston and cylinder, as aforesaid.

Referring now to the embodiment of my invention shown in Figs. 5 and 6, the parts illustrated therein are all substantially the same as in the embodiment previously described, except that in Fig. 5 the centrally perforated bridge 54 is made impervious except for its central perforation and except for an additional valve opening 55 provided for a purpose later described.

Figure 5:
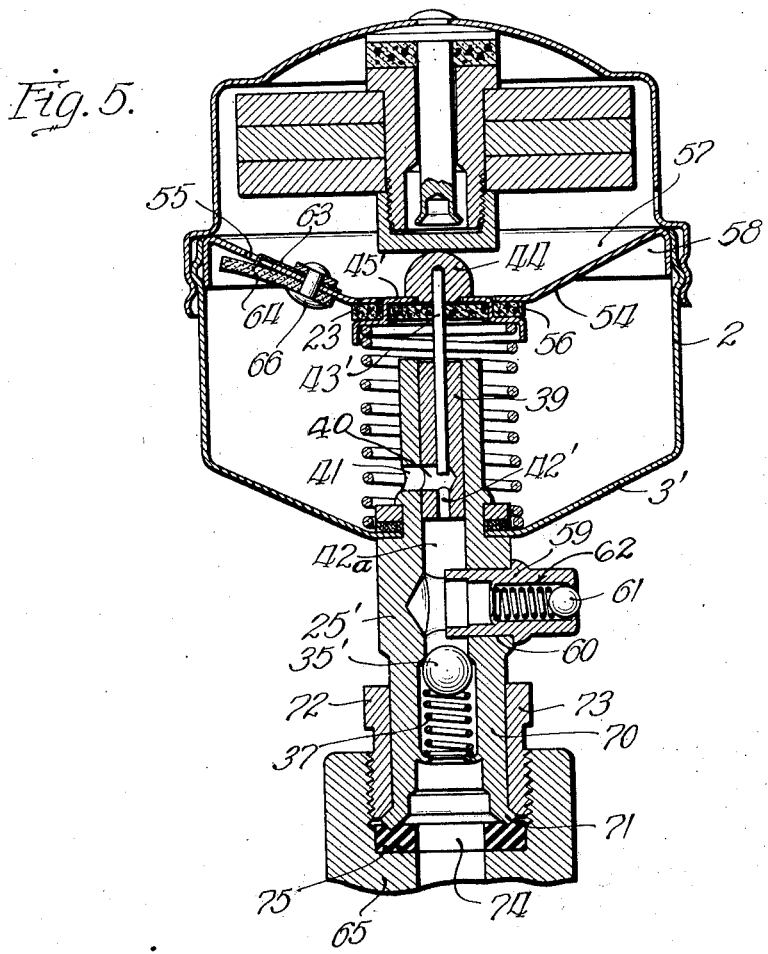
Fig. 5 is a longitudinal medial sectional view of a second embodiment of my invention.

Relative to the mechanical function of forming a stop for the piston rod 43' and serving to align said rod, the bridge 54 functions as does the bridge annulus 23 of the foregoing embodiment, though in the embodiment of Fig. 5 an annular gasket 56 is provided intermediate an outer shoulder of the element 45', supported by the knob 44', and the center portion 23' of the bridge 54 bordering its central aperture.

The bridge 54 is preferably formed as shown as a disk having a plane annular center with outwardly diverging walls 57 extending therefrom and terminating in a downturned tubular flange 58 making tight rigid engagement with the inner surfaces of the lateral walls of the casing 2 adjacent their rim.

In each of the embodiments of my invention, the operating parts of the mechanism are so disposed that they will not rattle because of vibratory movements of the chassis or other mechanism supporting the lubricators. It will be noted that applicant has employed means such as the washer 20, disposed between relatively oscillatable parts of the mechanism, wherever, due to vibrations of the vehicle chassis or other mechanism supporting the lubricator, relative vibration of these parts would cause a chattering, disagreeable noise. An object of my invention, to provide a quiet mechanism for the purpose, is thereby accomplished.

In the above embodiments of my invention, also, means are provided whereby the piston lubricant ejecting element, which is of relatively small weight, is guided in its reciprocatory movements merely by the walls of the bore of the weight which the piston reciprocates, and stresses due to the weight of the inertia element are not applicable laterally upon such piston, which is likewise free from any other lateral stresses. Therefore, a cause of undue wear and misalignment, inherent in prior constructions, is herein eliminated.

Figure 6:
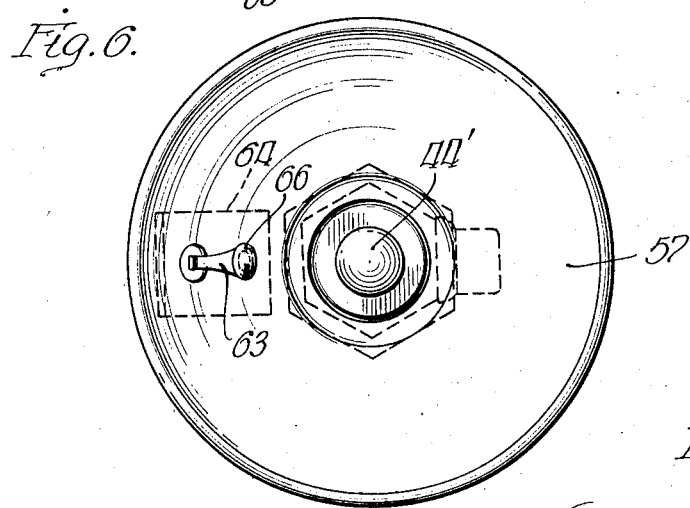
Fig. 6 is a plan view of the reservoir element of the embodiment of Fig. 5, with cap and contained inertia element removed.

In the embodiment of Figs. 5 and 6, provision is made for injecting lubricant through a lubricant receiving element 59 projected through a lateral opening 60 of the lubricator 25' disposed exteriorally of the casing 2 and closely adjacent the end wall 3' thereof.

Injection of lubricant will be accomplished by lubricant communicating interengagement of a nozzle of a grease gun or other source of lubricant under pressure with the element 59 to force lubricant under pressure past the valve 61 into the bore 62 of said element, and thence into the bore 42a to communicate lubricant to the interior of the casing 2 through the compression chamber 42' of the longitudinal bore of the cylinder 39, and the aligned apertures 40 and 41.

Lubricant, preferably of high viscosity, forced into the casing 2, filling the same, will displace air therein through the aperture 55 which is held open by engagement of the end of the leaf spring 63 with a leather flap valve element 64, which otherwise would close said aperture.

However, upon lubricant under pressure filling the casing, the flap valve element 64 will be pressed to seat against the inner surface of the disc 57 about said aperture 55 to close the passage therethrough, and to prevent lubricant passing the disc 57.

In the embodiment of Fig. 5, the lubricant receiving element 59 is disposed intermediate the spring pressed valve ball 35' and the compression chamber 42'. The spring pressed valve ball 61 of said lubricant receiving element, will prevent loss of lubricant pumped by the piston 43' and cylinder 39 into the passage 42 to force lubricant past the ball 35' and to the lubricant receiving passage of the element to be lubricated, a fragment of which is indicated in Fig. 5, at 65.

Fig. 6 is a plan view of the uncapped lubricating means of Fig. 5 to show the air vent valve 64 which is preferably composed of a flat piece of leather, fastened to the lower side of the inclined bridge 57, and the relatively weak flat leaf spring 63, secured by the same rivet 66, at the upper side of said bridge.

The check valve thereby formed is open under all conditions except when the high viscosity oil forced into the cup by the grease gun, engages said air vent valve. The flange 58 of the bridge 57, and the tubular flange 22 of the bridge of Fig. 1, may be each secured to the lateral walls of the casing 2 by a press fit therein, or they may be additionally soldered, and in the embodiment of Fig. 5, particularly, I prefer that a tight joint be secured, as by soldering, although the provision of a sealing joint is not necessary in the embodiment of Fig. 1.

The lubricator body of Fig. 5 terminates at its lower end in a tubular portion 70, containing the valve 35' and valve spring 37, whose operation will be well understood from the foregoing description of the embodiment of Fig. 1, and has its lower end outwardly flared at 71.

A hollow screw 72, having a hexagonal head 73, is telescoped over the stem 70 before outwardly flaring the end 71. The lubricating means of Fig. 5 is preferably secured to the element of bearing 65 within the recess 74 thereof, by screw threading the hollow screw 72 in the threaded lateral walls of said recess, the flared mouth 71 of the lubricator stem making clamping engagement with annular gasket 75 interposed between a shoulder of the bearing element recess and said outwardly flared mouth 71 of the stem.

By this construction, the lubricant receiving element may extend in any desired radial direction, so that recharging of the lubricator may be had from such a direction from which access to the lubricator may most readily be had.

Having thus described my invention in certain embodiments, I am aware that numerous and extensive departures may be made from the embodiments herein illustrated and described but without departing from the spirit of my invention.

I claim:

1. In a lubricating system, a lubricator container comprising a pair of oppositely disposed separably connected cap and casing cups, a weight unitarily reciprocably supported by said cap cup, a lubricant ejecting means unitarily secured to the other cup, and a supporting dispensing conduit for the casing cup, said weight engageable with said lubricant ejecting means to reciprocate same to force lubricant through the conduit upon abrupt longitudinal movements of the joined cups.

2. In a lubricant receptacle, a transverse wall therefor, an air venting valve opening therethrough, a bottom discharge outlet for the receptacle, automatic inertia operated means to dispense lubricant from the receptacle through said outlet and a lubricant receiving element supported by said outlet intermediate the receptacle and its discharge end for charging the receptacle with lubricant, and means responsive to engagement of lubricant therewith to close said air venting valve opening.

3. In a lubricant receptacle, a transverse wall therefor, an air venting valve opening therethrough, a bottom discharge outlet for the receptacle, automatic means to dispense lubricant from the receptacle through said outlet, a lubricant receiving element supported by said outlet intermediate the receptacle and its discharge end for charging the receptacle with lubricant, and means responsive to engagement of lubricant therewith to close said air venting valve opening, said automatic lubricant dispensing means comprising a cylinder, a piston reciprocable therein and an inertia weight element for reciprocating the piston in the cylinder.

4. In lubricating means, a casing comprising a cup and a cap separably connected, lubricant dispensing means supported by the cup and a weight forming an operating element therefor independently supported by the cap, a centrally perforated transverse wall for said cup and means operatively connecting said lubricator and element, said weight being in the form of an annulus, and a retaining guide for said weight comprising a rod rigidly supported by the cap axially thereof projected through the bore of said annulus.

5. In lubricating means, a casing comprising a cup and a cap separably connected, lubricant dispensing means supported by the cup, a weight forming an operating element therefor independently supported by the cap, a centrally perforated transverse wall for said cup, means operatively connecting said lubricator and element, said weight being in the form of an annulus, a retaining guide therefor comprising a rod rigidly supported by the cap axially thereof projected through the bore of said annulus, and means on said rod for preventing loss of the weight from the cap.

OSCAR U. ZERK.